(No Model.)
J. PORSCH, Jr.
BUTTER CUTTER.
No. 252,698. Patented Jan. 24, 1882.
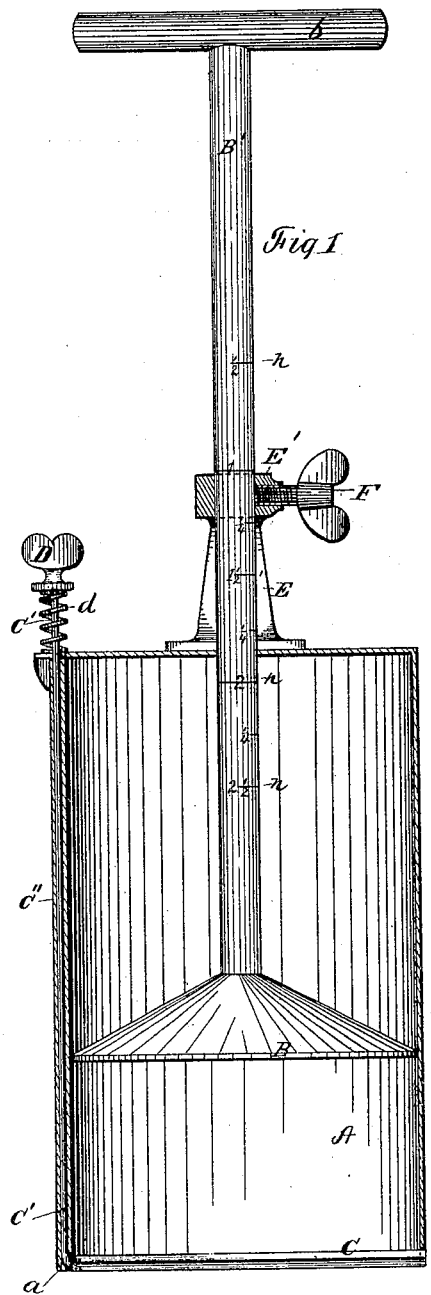
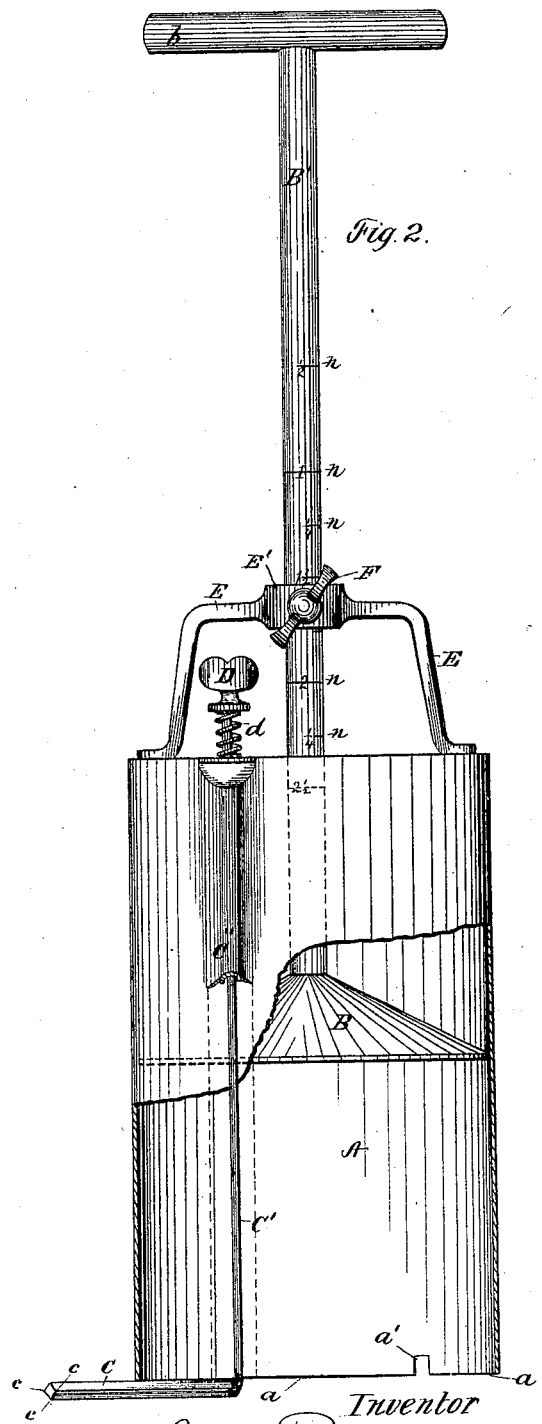
Witnesses
W. R. Edelin
B. B. Brown
Inventor
John Porsch jr
Per Hallock & Hallock.
Att'ys

UNITED STATES PATENT OFFICE.

JOHN PORSCH, JR., OF ERIE, PENNSYLVANIA.

BUTTER-CUTTER.

SPECIFICATION forming part of Letters Patent No. 252,698, dated January 24, 1882.

Application filed June 14, 1881. (No model.)

*To all whom it may concern:*

Be it known that I, JOHN PORSCH, Jr., a citizen of the United States, residing at Erie, Erie county, Pennsylvania, have invented new and useful Improvements in Butter-Cutters; and I do hereby declare that the following is a full, clear, and exact description thereof, reference being had to the accompanying drawings and the letters or figures of reference marked thereon.

My invention relates to devices for cutting out butter or lard from tubs, crocks, or firkins and forming the same into rolls or pats of desired size; and it consists in certain improvements thereon which will fully appear in the following general description and claim.

My device is shown in the accompanying drawings, as follows:

Figure 1 is a vertical section of the cutter with the handle and plunger in elevation. Fig. 2 is an elevation from the right of Fig. 1 with parts broken away. (The position of the undercutting-knife is changed in this figure to clearly show it.)

The parts are a circular cutter, A, which is in the form of a cylinder; an undercutting-knife, C; a plunger, B, for pushing the roll or pat out of the cylinder; a graduated plunger stem or handle, B'; a gage-screw, F, and other minor parts which will be properly indicated hereinafter.

The cylinder A may be made of wood faced at the cutting edge with metal, or of metal wholly.

The undercutting-knife has a vertical stem, C', running up the side of the cutter-cylinder in a housing, C'', and terminates at the top with a thumb-piece or handle, D. When the cutter is entering the butter the knife C lies diametrically across the mouth of the cylinder, the end opposite the stem C' resting in a notch, a', a spring, d, on the end of the stem serving to keep it place.

The plunger-stem B' is graduated, and marked to indicate the amount of butter that the cylinder will hold below the plunger. This stem passes through a yoke, E, and a binding-screw, F, will hold it at any point desired. Therefore the plunger can be adjusted firmly at any desired point, so as to permit the apparatus to cut and take out the desired amount of butter.

The under-cutter has four cutting-points, c c c c, so that it will pass easily through the butter in either direction.

The operation is as follows: The under-cutter is adjusted in the notch a', and thus lies diametrically across the mouth of the cutter. The plunger is adjusted to suit the amount of butter required from the tub or crock, and is secured there by the binding-screw F. The cutter is then pushed down into the mass of butter. (The under-cutter going down of course divides the cut, but this will unite again back of the knife.) The device is then revolved half-way around, which causes the under-cutter to cut horizontally under the butter contained in the cylinder. The device is then lifted out and brings with it the butter. By pressing down on the handle D the knife C will disengage from the notch a', and can then be swung around away from the face of the device, and then by loosening the plunger-stem from the clamping-screw the plunger can be pushed down and expel the roll or pat in fit shape for use. The cutter C having been swung around out of the way, the cake of butter is not cut by it in coming from the cylinder.

What I claim as new is—

In a butter-cutting apparatus, the combination of the cylinder A with yoke E, plunger B with stem B', working through said yoke, and the set-screw F within said yoke, for clamping said stem, substantially as and for the purposes set forth.

In testimony that I claim the foregoing I have hereunto set my hand this 14th day of February, 1881.

JOHN PORSCH, JR.

Witnesess:
SAM. WOODS,
JNO. K. HALLOCK.